United States Patent [19]
Sawyer et al.

[11] Patent Number: 5,586,801
[45] Date of Patent: Dec. 24, 1996

[54] STUD MOUNTED HOIST RING

[75] Inventors: David R. Sawyer, Smithfield; Douglas M. Wheeler, Newport News, both of Va.

[73] Assignee: Newport News Shipbuilding and Dry Dock Company, Newport News, Va.

[21] Appl. No.: 329,929

[22] Filed: Oct. 27, 1994

[51] Int. Cl.$^6$ .............................. B66C 1/66; F16G 15/08
[52] U.S. Cl. ............................ 294/1.1; 403/78; 403/164; 410/101
[58] Field of Search .................................. 294/1.1, 82.1, 294/8.9; 411/171, 400; 403/78, 164; 410/101, 112–114

[56] References Cited

U.S. PATENT DOCUMENTS

| | | | |
|---|---|---|---|
| 3,297,293 | 1/1967 | Andrews et al. | 248/361 |
| 3,831,532 | 8/1974 | Smith et al. | 410/113 |
| 4,431,352 | 2/1984 | Andrews | 410/101 |
| 4,558,979 | 12/1985 | Andrews | 294/1.1 |
| 4,570,987 | 2/1986 | Wong et al. | 294/1.1 |
| 4,592,686 | 6/1986 | Andrews | 410/101 |
| 4,641,986 | 2/1987 | Tsui et al. | 403/164 |
| 4,684,304 | 8/1987 | Franks | 411/171 |
| 4,705,422 | 11/1987 | Tsui et al. | 403/60 |
| 4,850,772 | 7/1989 | Jenkins | 411/171 |
| 5,393,164 | 2/1995 | Renner et al. | 411/171 |

FOREIGN PATENT DOCUMENTS 3509877  7/1986  Germany ............................ 410/101

*Primary Examiner*—Dean Kramer
*Attorney, Agent, or Firm*—C. N. Rosen

[57] ABSTRACT

A stud mounted hoist assembly for lifting, moving, suspending, or loading material and equipment during construction comprises a ring assembly, a welding stud anchor, and a bushing having a chamfered inner cylindrical surface to accommodate weld flash when mounting the assembly to a load or overhead structure. The bushing and ring assembly provide pivot and swivel capability to the mount. One operator can quickly and securely install a temporary lifting point where and when needed without the assistance of support personnel.

6 Claims, 2 Drawing Sheets

STUD MOUNTED HOIST RING

BACKGROUND OF THE INVENTION

This invention relates generally to improvements in lifting devices, and more particularly to a flexible hoist ring assembly for moving, loading, suspending, or lifting material and equipment during outfitting of a ship under construction. This invention gives the individual user the flexibility to quickly install a safe temporary lifting point when and where needed, thereby minimizing delays especially those resulting from waiting for support personnel.

In the prior art, when the need arises to provide a lifting point during construction, a portable clamp is installed by attaching the clamp to overhead structure. However, when location does not permit the use of a clamp, a lifting pad is installed. This pad is generally a 75 mm×75 mm piece of steel plate having a hole in the center. The plate is welded along one edge to structure overhead the load and a chain fall is hung from the hole. After the pad is no longer needed, the plate must be cut off, disposed of, and the attachment point ground smooth.

Another device employed in the prior art for lifting a load is a hoist ring with an attached bolt. The bolt is generally attached to the load or to overhead structure either by drilling and tapping a hole in the load or structure or by through bolting.

The prior art has several disadvantages. Welding a steel plate to or drilling and tapping a hole in the overhead structure or load requires at least two trades: riggers, welders, and/or machinists, and involves a considerable amount of time. If the overhead structure is a high strength or specialty steel, as is often the case in shipbuilding, additional time and cost is required for preheating and inspection. Drilling and tapping a hole in overhead structure will leave a hole that must be plugged and welded once the lifting point is no longer needed. This method is unsuitable when overhead structure is too thin to drill and tap without significantly affecting its structural integrity.

SUMMARY OF THE INVENTION

The stud mounted hoist ring assembly of the present invention eliminates many of the deficiencies of the prior art. The stud mounted hoist ring includes a welding stud anchoring means for attaching the hoist ring to a load lifting point; a bushing having a flanged portion on one end for bearing engagement with a load lifting point, a sleeve portion on the other end, and a chamfered inner cylindrical surface to clear weld flash when the welding stud is attached to the load lifting point using conventional stud arc welding methods. A ring assembly is included for attaching lifting ropes or chain falls, having a collar and pivotal loop in swivel engagement with the bushing.

DETAILED DESCRIPTION

Figure 1:
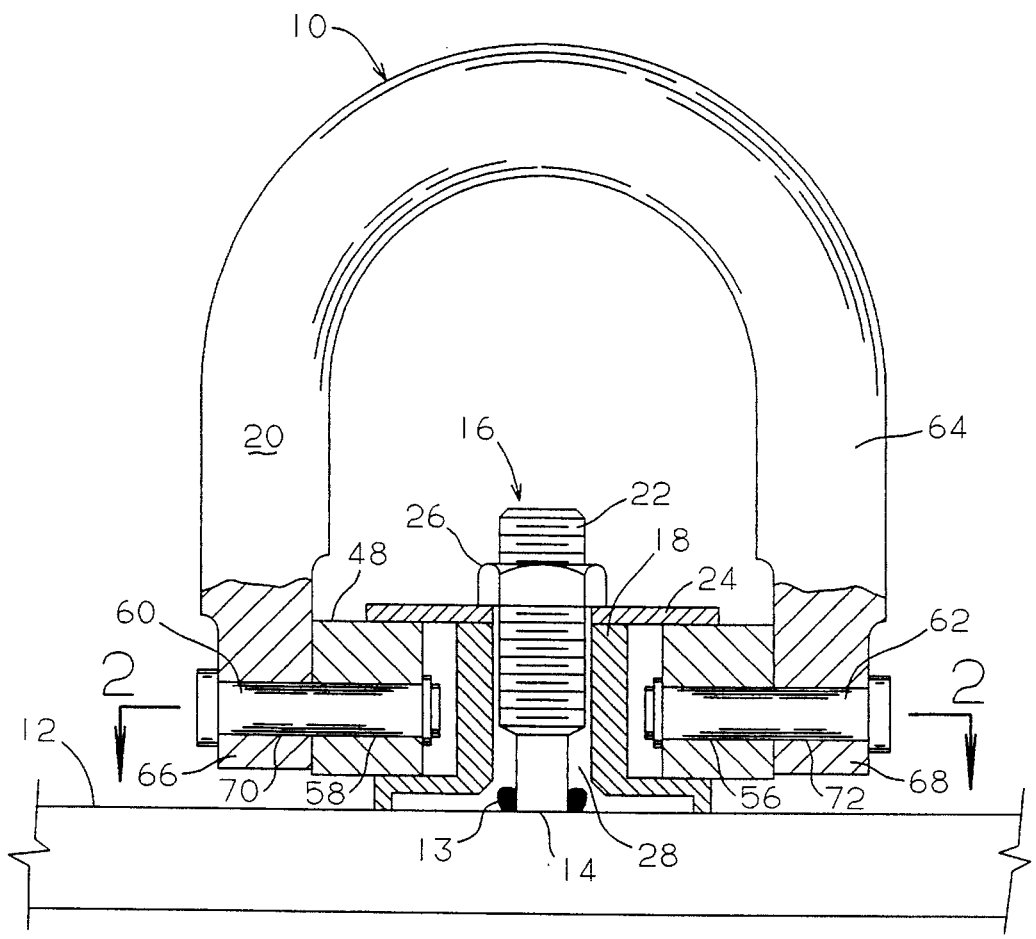
FIG. 1 is a cross-sectional elevation of the preferred embodiment of the present invention.
Figure 3:
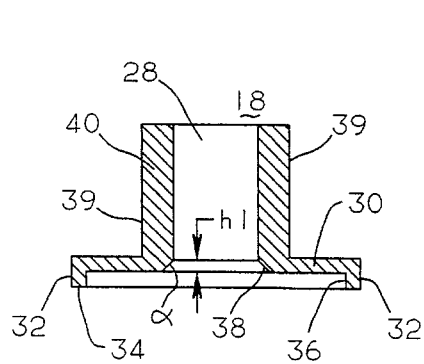
FIG. 3 is an elevation of the bushing of the embodiment of FIG. 1.

Referring to the drawings, and particularly FIG. 1, the stud mounted hoist ring assembly of the present invention is generally indicated by numeral 10 and is shown attached to load or structure 12 at lifting point 14. Hoist ring 10 includes a welding stud anchoring means 16, a bushing 18, and a ring assembly 20. The welding stud anchoring means 16 includes a welding stud 22, shown welded to lifting point 14 by conventional stud arc welding methods, a flat washer 24, and a locking nut 26. When hoist ring 10 is assembled, flat washer 24 is disposed between bushing 18 and locking nut 26 and is in compressive engagement with bushing 18. Locking nut 26 is tightened on threaded welding stud 22 against flat washer 24 and holds bushing 18 in a fixed relationship with welding stud 16 and the load or structure 12. As seen in FIG. 3 bushing 18 includes a longitudinal opening 28 for receiving welding stud 22. Bushing 18 further includes a flanged end 30 having annular side walls 32 and bearing surface 34 for bearing engagement with a load or structure 12. Flanged end 30 of bushing 18 also includes cylindrical inner surface 36 and chamfered inner surface 38. Chamfered inner surface 38 has depth h1 and being disposed at angle α relative to cylindrical surface 36 to allow bushing 18 to clear weld flash 13 at the welded end 46 of welding stud 22 associated with attaching welding stud 22 to a load lifting point 14. In a preferred embodiment depth h1 is preferably 3 mm and angle α is 45 degrees. Bushing 18 further includes a sleeve portion 40 through which a longitudinal bore 28 is disposed. Chamfered inner surface 38 is disposed at the junction of flanged end 30 and sleeve portion 40 of bushing 18.

Figure 4:
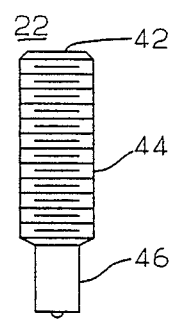
FIG. 4 is an elevation of the welding stud of the embodiment of FIG. 1.

Referring to FIG. 4, welding stud 22 is shown having a free end 42, a threaded shank 44, and a welding end 46. In a preferred embodiment, welding end 46 has a smaller diameter than threaded shank 44 to reduce the amount and height of the weld flash 13 produced when welding stud 22 is attached to lifting point 14. In a preferred embodiment, welding stud 22 has a typical diameter of 15 mm at threaded shank portion 44 and 12 mm at welding end 46.

Figure 2:
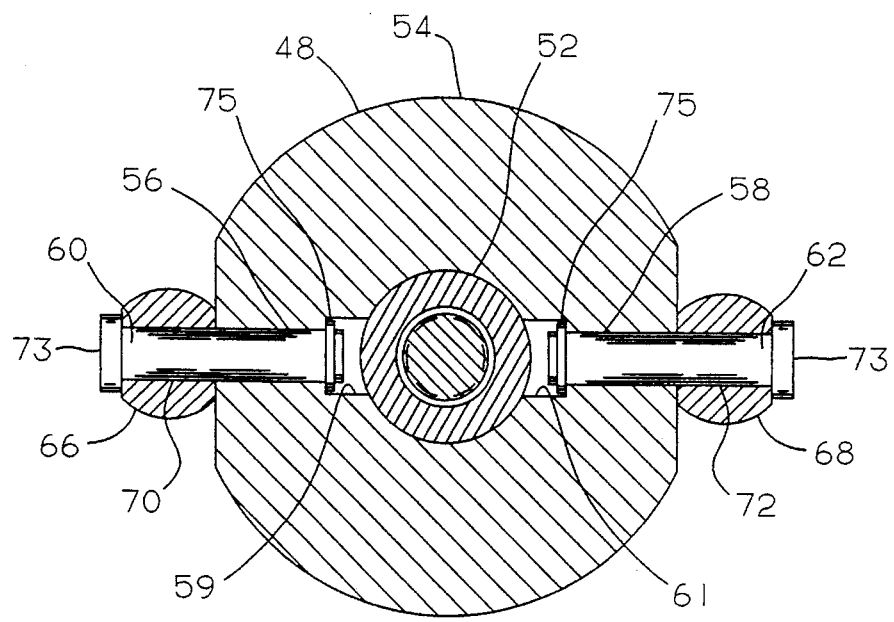
FIG. 2 is a cross-sectional plan view of the embodiment of FIG. 1.

As can be seen in FIG. 2 and FIG. 3, ring assembly 20 includes annular collar 48 concentric with and in rotational engagement with side walls 39 of sleeve portion 40 of bushing 18. Annular collar 48 includes inner and outside side walls 52 and 54 respectively, having axially aligned through bores 56 and 58. Collar 48 further includes slots 59 and 61 in inner side wall 52 for the ends of pivot pin elements 60 and 62 which are disposed in through bores 56 and 58 respectively. Ring assembly 20 further includes a substantially arcuate loop or U-shaped ring 64 having legs 66 and 68 at an open end. Legs 66 and 68 include through bores 70 and 72. Pivot pin elements 60 and 62 are disposed in through bores 70 and 72 holding arcuate loop 64 in pivotal engagement with annular collar 48. Pivot pin elements 60 and 62 are held in through bores 56 and 58 of annular collar 48 and through bores 70 and 72 of U-shaped ring 64 by having, for example, a large head 73 on one end and a slot with a retaining clip 75 on the other end.

Figure 5:
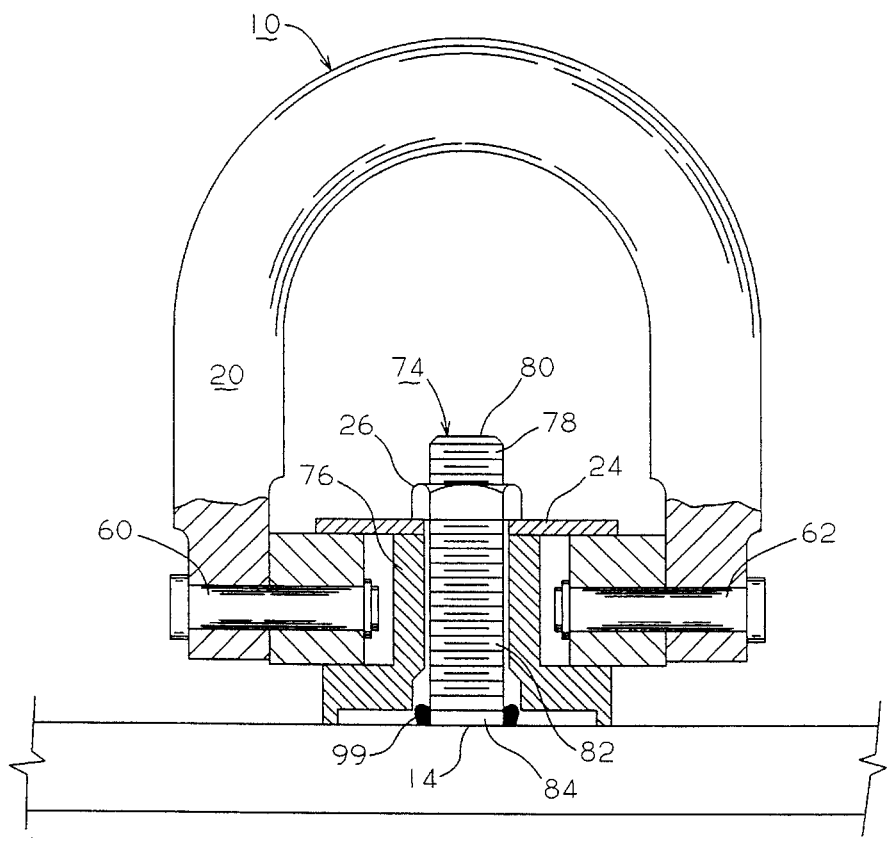
FIG. 5 is a cross-sectional view showing an alternate embodiment of the present invention.
Figure 6:
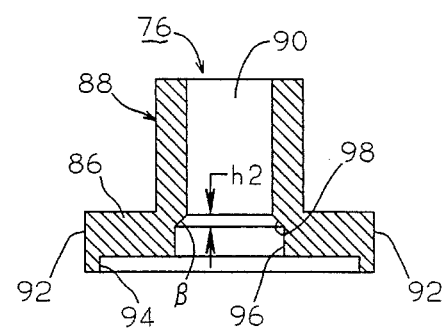
FIG. 6 is a cross-sectional view showing the bushing of the embodiment of FIG. 5.

In an alternate embodiment of the present invention shown in FIGS. 5 and 6, hoist ring assembly 10 includes a welding stud anchoring means 74, a bushing 76, and a ring assembly 20. The welding stud anchoring means 74 includes a welding stud 78 having a free end 80, a threaded shank portion 82, and welding end 84 for welding to a load lifting point 14 using conventional stud arc welding methods. Welding stud 78 has substantially constant diameter over its entire length. The welding stud anchoring means 74 also includes a flat washer 24, and a locking nut 26. When assembled, the locking nut 26 holds the flat washer 24 in compressive engagement with the sleeve portion 88 of bushing 76. As shown particularly in FIG. 6, bushing 76 has a flanged end 86 and a sleeve portion 88. Sleeve portion 88 includes a longitudinal bore 90 for receiving welding stud 78. Flanged end 86 of bushing 76 has annular side walls 92, cylindrical inner surfaces 94 and 96, and chamfered inner cylindrical surface 98. Inner surfaces 94 and 96 are in stepped relationship to each other, the step being formed by the diameter of inner surface 96 being smaller than the diameter of inner surface 94. Chamfered inner cylindrical surface 98 is disposed at the junction of flanged end 86 and sleeve portion 88 of bushing 76 having a depth h2 and being disposed at angle β relative to inner cylindrical surfaces 94 and 96. In this embodiment, chamfered inner surface 98 has depth h2 preferably 1.5 mm and angle β is 45 degrees. The combination of stepped cylindrical inner surfaces 94 and 96 along with chamfered inner cylindrical surface 98 allows bushing 86 to accommodate higher weld flash 99 around the outside surface of welding end 84 of welding stud 78 when welding stud 78 is welded to load lifting point 14. This embodiment is preferable when larger diameter welding studs, for example 18 mm, are used for attaching hoist ring 10 to load lifting point 14.

From the foregoing description, it is evident that changes, adaptations and modifications of the present invention could be made by those skilled in the art. However, all such variations should be considered as within the scope of the description, limited solely by the appended claims.

We claim:

1. A hoist ring assembly for attachment to a load lifting point comprising:
   a welding stud having a free end, a threaded shank, and a second end for welding to a load lifting point;
   a bushing concentric with said welding stud;
   a ring assembly in rotating and swivel engagement with said bushing;
   a locking nut threadably engaged on said stud for holding said bushing against said lifting point;
   a flat washer disposed on said welding stud between said bushing and said locking nut;
   said bushing further comprising a bearing flange at one end for bearing engagement with the load lifting point and a sleeve at the other end, said bearing flange having an outer cylindrical surface and a plurality of inner cylindrical surfaces, said inner cylindrical surfaces being in stepped relationship with each other, said steps being formed by the diameter of one of said inner cylindrical surfaces being larger at an end of said flange in bearing engagement with said load lifting point and the diameter of the other of said inner cylindrical surfaces being smaller at an end of said flange adjacent said sleeve end, at least said smaller diameter inner cylindrical surface having a chamfer.

2. A hoist ring assembly for attachment to a load lifting point comprising:
   a welding stud having a threaded free end and a second end fixably attached to the load lifting point;
   a bushing having a longitudinal bore for receiving said welding stud, said bushing having a bearing flange at one end for bearing engagement with the load lifting point and a sleeve at the other end, said bearing flange having an outer cylindrical surface and a plurality of inner cylindrical surfaces, said inner cylindrical surfaces in stepped relationship with each other, said steps being formed by the diameter of one of said inner cylindrical surfaces being larger at an end of said flange in bearing engagement with said load lifting point and the diameter of the other of said inner cylindrical surfaces being smaller at an end of said flange adjacent said sleeve end, at least said smaller diameter inner cylindrical surface having a chamfer;
   a ring assembly including a U-shaped ring, an annular collar and pivot pins, said pins extending through bores at the ends of the legs of said U-shaped ring and through bores in said annular collar and being retained therein to render said U-shaped ring pivotable about said pivot pins in an arc of substantially 180 degrees;
   a locking nut threadably engaged on said threaded free end of said welding stud;
   a flat washer disposed on said welding stud between said bushing and said locking nut to retain said bushing fixed with respect to said load lifting point and said stud;
   said ring assembly being pivotable for 360 degrees about said bushing.

3. A hoist ring assembly for attachment to a load lifting point comprising:
   a welding stud anchoring means;
   a bushing having a longitudinal bore for receiving said welding stud anchoring means;
   a ring assembly in rotating and swivel engagement with said bushing;
   said welding stud anchoring means comprising a welding stud having a free end, a threaded shank, and a second end for welding to said load lifting point, a locking nut threadably engaged on said stud for holding said bushing against said lifting point, and a flat washer disposed on said welding stud, said washer being held adjacent said bushing by said locking nut;
   said bushing further comprising a bearing flange at one end for bearing engagement with the load lifting point and a sleeve at the other end, said bearing flange having an outer cylindrical surface and a plurality of inner cylindrical surfaces, said inner cylindrical surfaces being in stepped relationship with each other, said steps formed by diameters of said inner cylindrical surfaces being larger at an end of said flange in bearing engagement with said load and smaller at an end of said flange adjacent said sleeve end, and at least said smaller diameter inner cylindrical surface having a chamfer.

4. A hoist ring assembly for attachment to a load lifting point comprising:
   a welding stud having a threaded free end and a second end fixably attached to the load lifting point;
   a bushing having a longitudinal bore for receiving said welding stud, said bushing having a bearing flange at one end for bearing engagement with the load lifting point and a sleeve at the other end, said bearing flange having an outer cylindrical surface and a plurality of inner cylindrical surfaces, said inner cylindrical surfaces in stepped relationship with each other, said steps formed by diameters of said inner cylindrical surfaces being larger at an end of said flange in bearing engagement with said load lifting point and smaller at an end of said flange adjacent said sleeve end, at least said smaller diameter inner cylindrical surface having a chamfer;

a ring assembly having an annular collar with inner and outer side walls, said inner side wall being in rotatable engagement with said sleeve end of said bushing, said side walls having through bores for receiving pivot pin elements;

pivot pin elements in axial alignment, integrally disposed in said side walls of said annular collar;

a substantially arcuate loop having legs at an open end, said legs having through bores at the ends of said legs, said pivot pin elements disposed in said bores of said legs and holding said legs in pivotal engagement with said outer facing side wall of said annular collar;

a locking nut threadably engaged on said threaded free end of said welding stud; and a flat washer disposed on said welding stud, said washer being held adjacent said sleeve end of said bushing by said locking nut.

5. A hoist ring assembly for attachment to a load lifting point comprising:

a welding stud having a threaded free end and a welding end, said welding end having a smaller diameter than said free end;

a bushing concentric with said welding stud, said bushing comprising a bearing flange at one end for bearing engagement with the load lifting point and a sleeve at the other end, said bearing flange having an outer cylindrical surface, an inner cylindrical surface, and a chamfered inner cylindrical surface at a junction between said sleeve end and said bearing flange of said bushing;

a ring assembly in rotating and swivel engagement with said bushing;

a locking nut threadably engaged on said stud for holding said bushing against said lifting point;

a flat washer disposed on said welding stud between said bushing and said locking nut; and said welding end of said stud having a length extending from said load lifting point beyond said chamfered inner surface of said bushing when said stud is welded to said load lifting point.

6. A hoist ring assembly for attachment to a load lifting point as in claim 5, wherein, said smaller diameter of said welding end being constant over the full length of said welding end.

* * * * *